United States Patent
Zheng et al.

(10) Patent No.: US 12,040,863 B2
(45) Date of Patent: Jul. 16, 2024

(54) UPLINK TRANSMISSION METHOD AND APPARATUS, SIGNAL RECEIVING METHOD AND APPARATUS, TERMINAL, SERVICE NODE, AND MEDIUM

(71) Applicant: ZTE Corporation, Shenzhen (CN)

(72) Inventors: Guozeng Zheng, Shenzhen (CN); Hao Wu, Shenzhen (CN); Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 25 days.

(21) Appl. No.: 17/777,264

(22) PCT Filed: Dec. 24, 2020

(86) PCT No.: PCT/CN2020/138886
§ 371 (c)(1),
(2) Date: May 16, 2022

(87) PCT Pub. No.: WO2021/129716
PCT Pub. Date: Jul. 1, 2021

(65) Prior Publication Data
US 2022/0416863 A1    Dec. 29, 2022

(30) Foreign Application Priority Data
Dec. 26, 2019   (CN) .......................... 201911367563.3

(51) Int. Cl.
*H04B 7/06*   (2006.01)
*H04B 7/0456*   (2017.01)
*H04L 5/00*   (2006.01)

(52) U.S. Cl.
CPC ......... *H04B 7/0617* (2013.01); *H04B 7/0456* (2013.01); *H04L 5/0048* (2013.01)

(58) Field of Classification Search
CPC .. H04B 7/0617; H04B 7/0456; H04B 7/0478; H04B 7/0634; H04B 7/043; H04B 7/086;
(Continued)

(56) References Cited

U.S. PATENT DOCUMENTS 9,917,625 B2    3/2018   Dinan
2017/0318543 A1   11/2017   Nam et al.
(Continued)

FOREIGN PATENT DOCUMENTS

CN   103475401 A   12/2013
CN   103905104 A    7/2014
(Continued)

OTHER PUBLICATIONS

CN201911367563.3, Jul. 13, 2023, First Office Action.
(Continued)

*Primary Examiner* — Vineeta S Panwalkar
(74) *Attorney, Agent, or Firm* — Wolf, Greenfield & Sacks, P.C.

(57) ABSTRACT

Provided are a method and apparatus for uplink transmission, a method and apparatus for receiving signal, a terminal device, a service node and a non-transitory computer-readable storage medium. The method for uplink transmission may include: performing beamforming on a Sounding Reference Signal (SRS) according to a target parameter, and transmitting the SRS beamformed, wherein the target parameter is determined according to downlink channel information; receiving precoding information; and transmitting an uplink transmission signal according to the target parameter and the precoding information.

20 Claims, 3 Drawing Sheets

Performing beamforming on a Sounding Reference Signal (SRS) according to a target parameter, where the target parameter is determined according to downlink channel information; — 110

Receiving precoding information — 120

Transmitting an uplink transmission signal according to the target parameter and the precoding information — 130

(58) Field of Classification Search
CPC ... H04L 5/0048; H04L 5/0051; H04L 5/0007; H04W 72/23
See application file for complete search history.

(56) References Cited

U.S. PATENT DOCUMENTS

2019/0149205 A1* 5/2019 Kim .................. H04B 7/0404
                                                            375/267
2019/0199553 A1  6/2019 Park et al.

FOREIGN PATENT DOCUMENTS

| CN | 109565311 A | 4/2019 |
|---|---|---|
| CN | 109792285 A | 5/2019 |
| CN | 111130607 A | 5/2020 |
| WO | WO 2019/029697 A1 | 2/2019 |

OTHER PUBLICATIONS

CN201911367563.3, Jul. 11, 2023, First Search Report.
IN202227041347, Oct. 20, 2022, Examination Report.
PCT/CN2020/138886, Mar. 22, 2021, International Search Report and Written Opinion.
First Office Action for Chinese Application No. 201911367563.3, dated Jul. 13, 2023.
First Search Report for Chinese Application No. 201911367563.3, dated Jul. 11, 2023.
Examination Report for Indian Application No. 202227041347, dated Oct. 20, 2022.
International Search Report and Written Opinion for International Application No. PCT/CN2020/138886, dated Mar. 22, 2021.
[No Author Listed] UL MIMO for non-codebook based transmission, Ericsson Agenda Item 6.1.2.1.3. 3GPP TSG-RAN WG1 #90. Prague, Czech Republic, Aug. 21-25, 2017:1-4.
First Office Action for Korean Application No. 10-2022-7013501, dated Jan. 11, 2024.
Extended European Search Report for European Application No. 20907191.9, dated Dec. 19, 2023.
[No Author Listed] 3GPP TSG RAN WG1 Meeting #88bis, Agenda Item 8.1.2.4.4: Discussion on SRS Design for NR. ZTE, ZTE Microelectronics. Apr. 3-7, 2017:1-3.
Hearing Notice for Indian Patent Application No. 202227041347, dated May 24, 2024.

* cited by examiner

UPLINK TRANSMISSION METHOD AND APPARATUS, SIGNAL RECEIVING METHOD AND APPARATUS, TERMINAL, SERVICE NODE, AND MEDIUM

CROSS-REFERENCE TO RELATED APPLICATION

This application is a national stage filing under 35 U.S.C. § 371 of international application number PCT/CN2020/138886, filed Dec. 24, 2020, which claims priority to Chinese patent application No. 201911367563.3, filed Dec. 26, 2019. The contents of these applications are incorporated herein by reference in their entirety.

TECHNICAL FIELD

The present disclosure relates to a wireless communication network, for example, to a method and apparatus for uplink transmission, a method and apparatus for receiving signal, a terminal device, a service node and a non-transitory computer-readable storage medium.

BACKGROUND

The precoding of uplink transmission is usually a precoding indicated by a service node. The precoding is selected from a predefined codebook. This method requires the use of wideband precoding and has a low precoding precision, but is limited in the performance improvement of uplink transmission. In a case where uplink and downlink channels are completely reciprocal or partially reciprocal, a terminal device cannot obtain a high-precision precoding on the basis of downlink channel measurement. In the existing technology, the precoding precision of uplink transmission signals is low, and the precision and reliability of uplink transmission cannot be ensured.

SUMMARY

The present disclosure provides a method and an apparatus for uplink transmission, a method and an apparatus for signal receiving, a terminal device, a service node and a medium, for improved precision and reliability of uplink transmission.

According to an embodiment of the present disclosure provided is a method for uplink transmission. The method may include: performing beamforming on a sounding reference signal (SRS) according to a target parameter, the target parameter being determined according to downlink channel information; receiving precoding information; and, transmitting an uplink transmission signal according to the target parameter and the precoding information.

According to another embodiment of the present disclosure further provided is a method for signal receiving. The method may include: receiving an SRS; transmitting precoding information according to the SRS; and, receiving an uplink transmission signal.

According to yet another embodiment of the present disclosure further provided is an apparatus for uplink transmission. The apparatus may include a beamforming module, a precoding information receiving module and an uplink transmission module. The beamforming module is configured to perform beamforming on an SRS according to a target parameter, the target parameter being determined according to downlink channel information. The precoding information receiving module is configured to receive precoding information. The uplink transmission module is configured to transmit an uplink transmission signal according to the target parameter and the precoding information.

According to yet another embodiment of the present disclosure further provided is an apparatus for signal receiving. The apparatus may include a signal receiving module, a precoding information transmitting module and an uplink receiving module. The signal receiving module is configured to receive an SRS. The precoding information transmitting module is configured to transmit precoding information according to the SRS. The uplink receiving module is configured to receive an uplink transmission signal.

According to yet another embodiment of the present invention further provided is a terminal device. The terminal device may include one or more processors and a storage device. The storage device is configured to store one or more programs which, when executed by the one or more processors, cause the one or more processors to carry out the method for uplink transmission described above.

According to yet another embodiment of the present invention further provided is a service node. The service node may include one or more processors and a storage device. The storage device is configured to store one or more programs which, when executed by the one or more processors, cause the one or more processors to carry out the method for signal receiving described above.

According to yet another embodiment of the present disclosure further provided is a non-transitory computer-readable storage medium having computer programs stored thereon which. When executed by a processor, the computer programs cause the processor to carry out the method for uplink transmission described above.

DETAILED DESCRIPTION

The present disclosure will be described below by embodiments with reference to the accompanying drawings. It should be understood that the specific embodiments described herein are merely used for illustrating the present disclosure, rather than limiting the present disclosure. In addition, it is to be noted that, for the convenience of description, only some but not all of structures related to the present disclosure are shown in the accompanying drawings.

In a Time Division Duplexing (TDD) or Frequency Division Duplexing (FDD) system, uplink and downlink channels may be completely reciprocal or partially reciprocal. Complete reciprocity means that the features of uplink channels can be completely obtained from downlink channel measurements and the features of downlink channels can be completely obtained from uplink channel measurements.

Partial reciprocity means that some features (e.g., angle, angle spread, delay, delay spread, etc.) of uplink channels can be obtained from downlink channel measurements and some features of downlink channels can be obtained from uplink channel measurements. Through the complete reciprocity or partial reciprocity, the feedback precision of channel state information can be improved and the feedback overhead of channel state information can be reduced.

The precoding of an uplink transmission signal usually adopts a precoding indicated by a service node (e.g., a base station), and the precoding is selected from a predefined codebook. This method uses a wideband precoding and has a low precoding precision. In the case of partial reciprocity between uplink and downlink channels, the performance improvement of uplink transmission is limited. In the existing technology, the precoding precision of uplink transmission signals is low, and the precision and reliability of uplink transmission cannot be ensured.

In an embodiment of the present disclosure, a method for uplink transmission is provided, which is applied to a user equipment (UE). A terminal device determines a target parameter according to downlink channel information and performs beamforming on an SRS by utilizing the target parameter. Then, the terminal device transmits the beamformed SRS to a service node to reflect channel state information for the service node to make decisions and instructions. The terminal device transmits an uplink transmission signal in consideration of the precoding information fed back by the service node, thereby improving the precision and reliability of uplink transmission.

Figure 1:
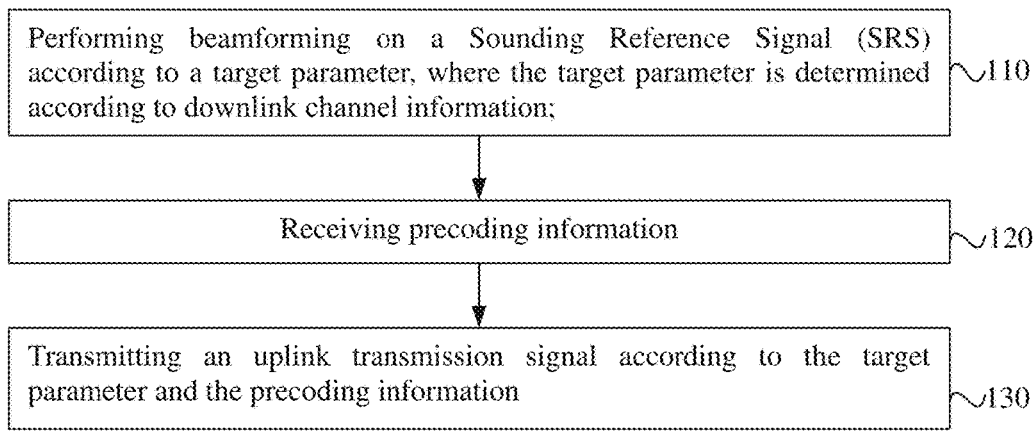
FIG. 1 is a flowchart of a method for uplink transmission according to an embodiment.

FIG. 1 is a flowchart of a method for uplink transmission according to an embodiment. As shown in FIG. 1, the method provided in the embodiment includes steps S110 to S130.

At S110, beamforming is performed on a sounding reference signal (SRS) according to a target parameter, where the target parameter is determined according to downlink channel information.

At S120, precoding information is received.

At S130, an uplink transmission signal is transmitted according to the target parameter and the precoding information.

In the embodiment, a terminal device acquires, according to downlink channel information, a target parameter that reflects channel state information of a downlink channel, and performs beamforming on an SRS by utilizing the target parameter. The beamforming process enables the SRS to carry the channel state information of the downlink channel. A service node can learn the channel state information of an uplink channel by receiving the beamformed SRS, and then makes a decision on this basis and feed precoding information back to the terminal device, so as to instruct a UE to transmit an uplink transmission signal by utilizing a corresponding resource and port. Thus, the reliability of uplink transmission is ensured, and the signaling overhead is also saved. The precoding information at S120 is determined by the service node by receiving the SRS.

In an embodiment, the target parameter includes a first matrix, and the number of rows of the first matrix is greater than or equal to the number of columns. Column vectors of the first matrix are basis vectors. The basis vectors are selected from a predefined vector space or determined according to the downlink channel information.

In the embodiment, the target parameter includes a first matrix (denoted as $W_1$) determined according to the downlink channel information. The downlink channel information can be obtained by a downlink reference signal transmitted by the service node. The dimensionality of $W_1$ can be denoted as $N_r \times L_1$ ($L_1 \leq N_r$). Each column of $W_1$ is a basis vector, and each basis vector may be selected from the predefined vector space or may be generated in real time according to the downlink channel.

In an embodiment, the configuration type of the SRS includes a first type and a second type. The first type includes: one SRS resource set corresponds to one downlink reference signal, one SRS resource set contains one SRS resource, and the number of ports contained in one SRS resource is equal to the number of columns of the target parameter. The second type includes: one SRS resource set corresponds to one downlink reference signal, each SRS resource in one SRS resource set corresponds to one port, and the number of SRS resources contained in one SRS resource set is equal to the number of columns of the target parameter.

In the embodiment, the SRS can be configured in any one of the following ways.

Way I: one SRS resource set is associated with one downlink reference signal, the SRS resource set contains one SRS resource, and the SRS resource contains $L_1$ ports.

Way II: one SRS resource set is associated with one downlink reference signal, the SRS resource set contains $L_1$ SRS resources, and each SRS resource contains one ports.

In an embodiment, the performing beamforming on an SRS according to a target parameter includes: when the configuration type of the SRS is the first type, the precoding of each port in one SRS resource corresponding to one column vector of the target parameter; and, when the configuration type of the SRS is the second type, the precoding of each SRS resource in one SRS resource set corresponding to one column vector of the target parameter.

In the embodiment, for the configuration way 1 of the SRS, the beamforming way is: the precoding of an $i^{th}$ ($i \leq L_1$) port of an SRS resource corresponds to an $i^{th}$ column (an $i^{th}$ basis vector) of $W_1$.

For the configuration way 2 of the SRS, the beamforming way is: the precoding of an $i^{th}$ ($i \leq L_1$) resource in an SRS resource set corresponds to an $i^{th}$ column (an $i^{th}$ basis vector) of $W_1$ matrix.

In an embodiment, the precoding information is used to indicate a second matrix. The number of rows of the second matrix is less than or equal to the number of columns of the first matrix, and the number of columns of the second matrix is equal to the number of layers of uplink transmission.

In the embodiment, the dimensionality of the second matrix (denoted as $W_2$) is $L_2 \times \upsilon$, where $L_2 \leq L_1$ and $\upsilon$ denotes the number of layers of uplink transmission.

In an embodiment, when the configuration type of the SRS is the first type, the number of rows of the second matrix is equal to the number of target ports selected from the ports contained in an SRS resource, and the number of rows of the second matrix is equal to the number of target basis vectors selected from the column vectors of the first matrix. When the configuration type of the SRS is the second type, the number of rows of the second matrix is equal to the number of target SRS resources selected from an SRS resource set, and the number of rows of the second matrix is equal to the number of target basis vectors selected from the column vectors of the first matrix.

In the embodiment, for the configuration way 1 of the SRS, $L_2$ denotes $L_2$ target ports selected from $L_1$ ports contained in an SRS resource, that is, it implicitly indicates that $L_2$ target basis vectors are selected from $L_1$ basis vectors in $W_1$.

For the configuration way 2 of the SRS, $L_2$ denotes $L_2$ target SRS resources selected from $L_1$ SRS resources, that is, it implicitly indicates that $L_2$ target basis vectors are selected from $L_1$ basis vectors in $W_1$.

In an embodiment, the second matrix contains a weighting coefficient of each target basis vector in each layer, and the weighting coefficient is a complex number.

In the embodiment, $W_2$ denotes a weighting coefficient of each of $L_2$ target basis vectors in a υ layer. After the terminal device learns the $L_2$ target basis vectors, the number of layers of uplink transmission and the weighing coefficient indicated by the service node, the terminal device can determine the precoding of the uplink transmission signal, thereby ensuring the precision and reliability of uplink transmission.

In an embodiment, the precoding information contains at least one of indication information of the number of layers of uplink transmission, selection information of target basis vectors, and quantification information of the second matrix.

In the embodiment, the precoding information may contain the indication information of the number of layers of uplink transmission, and the indication information of the number of layers of uplink transmission may also be implicitly indicated by the number of columns υ of $W_2$. The precoding information may contain the selection information of target basis vectors, and the selection information of target basis vectors may also be implicitly indicated according to a preset rule. For example, the number of rows $L_2$ of $W_2$ already implicitly indicates the number of target basis vectors. The terminal device can determine, according to the preset rule, how to select, from $L_1$ basis vectors of $W_1$, $L_2$ target basis vectors to transmit the uplink transmission signal. For example, $L_2$ target basis vectors having the best channel quality, or $L_2$ target basis vectors having channel state information satisfying the transmission requirements, or the like may be selected. The precoding information may contain the quantification information of the second matrix. In this case, the weighting coefficient in $W_2$ is quantified and then transmitted to the terminal device through signaling. The weighting coefficient can be quantified in one of the following ways.

Way I: direct quantification. For each weighing coefficient in $W_2$, a magnitude of the weighting coefficient is quantified by A bit, and a phase of the weighting coefficient is quantified by B bit.

Way II: $W_2$ is normalized and then quantified. That is, a weighting coefficient is selected as a reference coefficient which has a magnitude of 1 and a phase of 0 by default, and the position of the reference coefficient in $W_2$ is indicated by C bit. For each of other weighting coefficients, the magnitude of the weighting coefficient is quantified by A bit, and the phase of the weighting coefficient is quantified by B bit.

In an embodiment, the quantification information of the second matrix contains at least one of the position of the reference coefficient in the weighting coefficient in the second matrix, the quantified magnitude of the weighting coefficient, and the quantified phase of the weighting coefficient.

In an embodiment, the bit width of the precoding information is determined according to at least one of the number of columns of the first matrix; the number of target basis vectors; the maximum number of layers allowable for uplink transmission; the magnitude quantification precision for the weighting coefficient; and, the phase quantification precision for the weighting coefficient.

In the embodiment, the bit width of the precoding information is fixed and can be determined according to at least one of the number of columns $L_1$ of $W_1$, the number $L_2$ of the selected target basis vectors, the maximum number of layers allowable for uplink transmission (denoted as $RI_{max}$), the magnitude quantification precision (denoted as A), and the phase quantification precision (denoted as B). The maximum number of layers allowable for uplink transmission is greater than or equal to the number of layers for uplink transmission indicated by the service node, that is, $RI_{max} \geq \upsilon$. The magnitude quantification precision may be characterized by the number A of bits used for quantifying magnitude, and the phase quantification precision may be characterized by the number B of bits used for quantifying phase.

In an embodiment, the bit width of the indication information of the number of layers of uplink transmission contains 0 bit, or bits in a quantity that is the logarithm of the maximum number of layers allowable for uplink transmission.

In the embodiment, the indication information of the number υ of layers of uplink transmission may be 0 bit, that is, the number of layers of uplink transmission is implicitly indicated by (the number of rows of) $W_2$; or may be $\log_2(RI_{max})$ bits, where each bit is used to indicate whether each layer is selected to transmit the uplink transmission signal.

In an embodiment, the indication information of the number of layers of uplink transmission is associated with at least one of the magnitude quantification precision of the weighting coefficient, and the phase quantification precision of the weight coefficient.

In the embodiment, the number υ of layers of uplink transmission and the magnitude quantification precision A may have an association relationship. For example, in a case where the number of layers of uplink transmission is smaller, the magnitude quantification precision is higher, that is, the number A of bits used for quantifying magnitude is larger. The number υ of layers of uplink transmission and the phase quantification precision B may also have an association relationship. For example, in a case where the number of layers of uplink transmission is smaller, the phase quantification precision is higher, that is, the number B of bits used for quantifying phase is larger.

In an embodiment, the bit width of the selection information of target basis vectors includes one of the following: bits in a quantity that is the logarithm of the first parameter, where the first parameter is the maximum number of possible combinations of target basis vectors selected from the column vectors of the first matrix; and, bits in a quantity that is the number of column vectors of the first matrix.

In the embodiment, the bit width of the selection information of target basis vectors may be $\log_2(C_{L_1}^{L_2})$ bits, where $C_{L_1}^{L_2}$ denotes the maximum number of possible combinations of $L_2$ target basis vectors selected from $L_1$ basis vectors of $W_1$; or may be $L_2$ bits, where each bit is used to indicate whether each basis vector is selected as a target basis vector. If $L_1 = L_2$, that is, all basis vectors are selected as target basis vectors, the selection information of target basis vectors may not be indicated.

In an embodiment, the quantified magnitude of the weighting coefficient is determined according to the magnitude quantification precision. The quantified phase of the weighting coefficient is determined according to the phase quantification precision.

In an embodiment, the bit width of the quantification information of the second matrix may be $(A+B) \cdot L_2 \cdot RI_{max}$ bits or $\log_2(L_2 \cdot RI_{max}) + (L_2 \cdot RI_{max} - 1) \cdot (A+B)$ bits, where A is the magnitude quantification precision, B is the phase quantification precision, $L_2$ is the number of target basis vectors, and $RI_{max}$ is the maximum number of layers allowable for uplink transmission.

In an embodiment, the precoding matrix of the uplink transmission signal is a product of a third matrix and the second matrix. The third matrix consists of target basis vectors selected from the column vectors of the first matrix. The precoding of each layer of the uplink transmission signal corresponds to one column of the precoding matrix.

In the embodiment, the precoding matrix of the uplink transmission signal is $W=W_3 \times W_2$, where $W_3$ is a matrix consisting of $L_2$ corresponding target basis vectors selected from the $W_1$ matrix according to the selection information of $L_2$ target basis vectors indicated by the service node, and $W_3$ has a dimensionality of $\upsilon \times L_2$. In the precoding matrix of the uplink transmission signal, the precoding of a $j^{th}$ layer is determined on the basis of a $j^{th}$ column of W.

Figure 2:
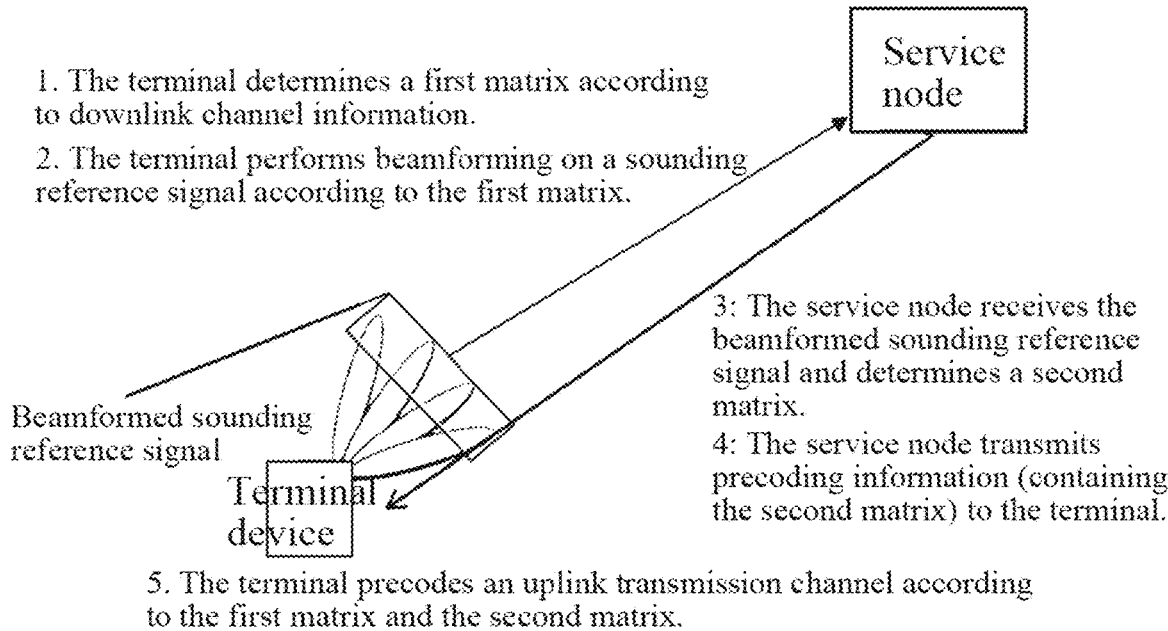
FIG. 2 is an implementation diagram of transmitting an uplink transmission signal according to an embodiment.

FIG. 2 is an implementation diagram of transmitting an uplink transmission signal according to an embodiment. As shown in FIG. 2, the implementation process of transmitting an uplink transmission signal includes the following steps.
1. A terminal device determines $W_1$ according to downlink channel information, where $W_1$ contains $L_1$ basis vectors.
2. The terminal device performs beamforming on an SRS according to $W_1$, and transmits the beamformed SRS to a service node.
3. The service node receives and processes the beamformed SRS to determine $W_2$.
4. The service node transmits precoding information (containing $W_2$) to the terminal device.
5. The terminal device precodes an uplink transmission channel according to $W_3$ and $W_2$ to obtain a corresponding precoding matrix $W=W_3 \times W_2$, wherein $W_3$ is determined according to $W_1$ and the precoding information of the service node.

In the method for uplink transmission provided in the embodiment, the terminal device performs beamforming on an SRS according to a target parameter and by utilizing the target parameter, and transmits the beamformed SRS to a service node to reflect channel state information for the service node to make decisions and instructions. The terminal device transmits an uplink transmission signal in consideration of the precoding information fed back by the service node. Thus, the precision and reliability of uplink transmission are improved, and the signaling overhead used for indicating uplink transmission is also saved. In addition, the service node does not need to separately indicate a layer, a port or a precoding selected from a codebook, so that the efficiency of uplink transmission is improved.

In an embodiment of the present disclosure, a method for signal receiving is further provided, which is applied to a service node. The service node makes a decision according to the beamformed SRS transmitted by a terminal device, and feeds back precoding information to the terminal device so as to instruct the terminal device to upload an uplink transmission signal, thereby improving the precoding precision and the reliability of uplink transmission.

Figure 3:
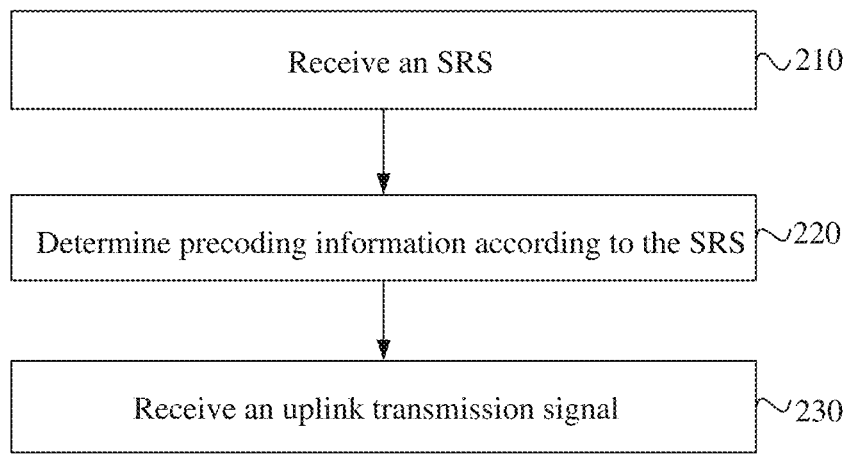
FIG. 3 is a flowchart of a method for signal receiving according to an embodiment.

FIG. 3 is a flowchart of a method for signal receiving according to an embodiment. As shown in FIG. 3, the method provided in the embodiment includes steps S210 to S230. The details that are not described in detail in this embodiment can refer to any one of the above embodiments.

At S210, an SRS is received.

At S220, precoding information is transmitted according to the SRS.

At S230, an uplink transmission signal is received.

In the embodiment, the SRS received by the service node is beamformed by a terminal device according to a target parameter, and the uplink transmission signal is transmitted by the terminal device according to the target parameter and the precoding information.

In an embodiment, the configuration type of the SRS includes a first type and a second type. The first type includes: one SRS resource set corresponds to one downlink reference signal, one SRS resource set contains one SRS resource, and the number of ports contained in one SRS resource is equal to the number of columns of the target parameter. The second type includes: one SRS resource set corresponds to one downlink reference signal, each SRS resource in one SRS resource set corresponds to one port, and the number of SRS resources contained in one SRS resource set is equal to the number of columns of the target parameter.

In the embodiment, the SRS can be configured in any one of the following ways.

Way I: one SRS resource set is associated with one downlink reference signal, the SRS resource set contains one SRS resource, and the SRS resource contains $L_1$ ports.

Way II: one SRS resource set is associated with one downlink reference signal, the SRS resource set contains $L_1$ SRS resources, and each SRS resource contains one ports.

In an embodiment, the target parameter includes a first matrix, and the number of rows of the first matrix is greater than or equal to the number of columns. Column vectors of the first matrix are basis vectors. The basis vectors are selected from a predefined vector space or determined according to the downlink channel information.

In the embodiment, the target parameter includes a first matrix ($W_1$) determined according to the downlink channel information. The downlink channel information can be obtained by a downlink reference signal transmitted by the service node. The dimensionality of $W_1$ can be denoted as $N_r \times L_1$ ($L_1 \leq N_r$). Each column of $W_1$ is a basis vector, and each basis vector may be selected from the predefined vector space or may be generated in real time according to the downlink channel.

In an embodiment, the precoding information is used to indicate a second matrix. The number of rows of the second matrix is less than or equal to the number of rows of the first matrix, and the number of columns of the second matrix is equal to the number of layers of uplink transmission.

In the embodiment, the dimensionality of the second matrix (denoted as $W_2$) is $L_2 \times \upsilon$, where $L_2 \leq L_1$ and $\upsilon$ denotes the number of layers of uplink transmission.

In an embodiment, the method further includes: when the configuration type of the SRS is the first type, selecting a target port from the ports contained in the SRS resource, the number of rows of the second matrix being equal to the number of target basis vectors selected from the column vectors of the first matrix; and, when the configuration type of the SRS is the second type, selecting a target SRS resource from the SRS resource set, the number of rows of the second matrix being equal to the number of target basis vectors selected from the column vectors of the first matrix.

In the embodiment, the selecting target basis vectors according to the configuration type of the SRS includes:
for the configuration way 1 of the SRS, selecting $L_2$ target ports from $L_1$ ports contained in an SRS resource, which implicitly indicates that $L_2$ target basis vectors are selected from $L_1$ basis vectors in $W_1$; and for the configuration way 2 of the SRS, selecting $L_2$ target SRS resources from $L_1$ SRS resources, which implicitly indicates that $L_2$ target basis vectors are selected from $L_1$ basis vectors in $W_1$.

In an embodiment, the second matrix contains a weighting coefficient of each target basis vector in each layer, and the weighting coefficient is a complex number.

In the embodiment, $W_2$ denotes a weighting coefficient of each of $L_2$ target basis vectors in a $\upsilon$ layer. After the terminal device learns the $L_2$ target basis vectors, the number of layers of uplink transmission and the weighing coefficient indicated by the service node, the terminal device can determine a precoding of the uplink transmission signal, thereby ensuring the precision and reliability of uplink transmission.

In an embodiment, the precoding information contains at least one of indication information of the number of layers of uplink transmission, selection information of target basis vectors, and quantification information of the second matrix. The quantification information of the second matrix contains at least one of the position of a reference coefficient in the weighting coefficient in the second matrix, a quantified magnitude of the weighting coefficient, and a quantified phase of the weighting coefficient.

In an embodiment, the bit width of the precoding information is determined according to at least one of the number of columns of the first matrix; the number of target basis vectors; the maximum number of layers allowable for uplink transmission; a magnitude quantification precision for the weighting coefficient; and, a phase quantification precision for the weighting coefficient.

In an embodiment, the bit width of the indication information of the number of layers of uplink transmission contains 0 bit, or bits in a quantity that is the logarithm of the maximum number of layers allowable for uplink transmission.

In an embodiment, the bit width of the selection information of target basis vectors includes one of the following: bits in a quantity that is the logarithm of the first parameter, where the first parameter is the maximum number of possible combinations of target basis vectors selected from the column vectors of the first matrix; and, bits in a quantity that is the number of column vectors of the first matrix.

In an embodiment, the method further includes at least one of: quantifying the weighting coefficient according to the magnitude quantification precision of the weighting coefficient to obtain a quantified magnitude of the weighting coefficient; quantifying the weighting coefficient according to the phase quantification precision of the weighting coefficient to obtain a quantified phase of the weighting coefficient; and, normalizing the second matrix.

In the embodiment, the weighting coefficient in $W_2$ is quantified ad then transmitted to the terminal device through signaling. The weighting coefficient can be quantified in one of the following ways.

Way I: direct quantification. For each weighing coefficient in $W_2$, a magnitude is quantified by A bit, that is, A is the magnitude quantification precision; and, a phase is quantified by B bit, that is, B is the phase quantification precision.

Way II: $W_2$ is normalized and then quantified. That is, a weighting coefficient is selected as a reference coefficient which has a magnitude of 1 and a phase of 0 by default, and the position of the reference coefficient in $W_2$ is indicated by C bit. For each of other weighting coefficients, the magnitude is quantified by A bit, that is, A is the magnitude quantification precision; and, the phase is quantified by B bit, that is, B is the phase quantification precision.

In the embodiment, the precoding matrix of the uplink transmission signal received by the service node is $W=W_3 \times W_2$, where $W_3$ is a matrix consisting of $L_2$ corresponding target basis vectors selected from the $W_1$ matrix according to the selection information of $L_2$ target basis vectors indicated by the service node, and $W_3$ has a dimensionality of $\upsilon \times L_2$. In the precoding matrix of the uplink transmission signal, the precoding of a $j^{th}$ layer is determined on the basis of a $j^{th}$ column of W.

The method for signal receiving provided in the embodiment belongs to the same concept as the method for uplink transmission provided in the above embodiments, and the technical details that are not described in detail in the embodiment can refer to ant one of the above embodiments.

Figure 4:
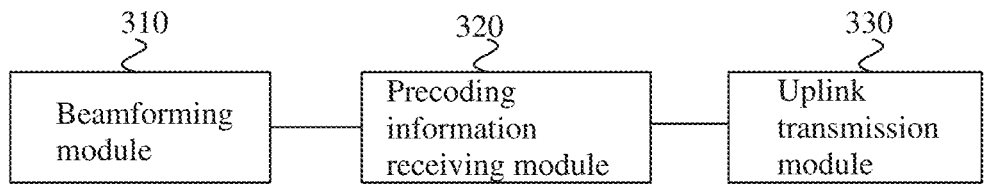
FIG. 4 is a schematic structural diagram of an apparatus for uplink transmission according to an embodiment.

An embodiment of the present disclosure further provides an apparatus for uplink transmission. FIG. 4 is a schematic structural diagram of an apparatus for uplink transmission according to an embodiment. As shown in FIG. 4, the transmission apparatus includes: a beamforming module 310, a precoding information receiving module 320 and an uplink transmission module 330.

The beamforming module 310 is configured to perform beamforming on an SRS according to a target parameter, the target parameter being determined according to downlink channel information. The precoding information receiving module 320 is configured to receive precoding information. The uplink transmission module 330 is configured to transmit an uplink transmission signal according to the target parameter and the precoding information.

In the signal transmitting apparatus provided in the embodiment, a target parameter is determined according to downlink channel information and then used to perform beamforming on an SRS. The beamformed SRS is transmitted to a service node to reflect channel state information for the service node to make decisions and instructions. The terminal device transmits an uplink transmission signal in consideration of the precoding information fed back by the service node. Therefore, the precision and reliability of uplink transmission are improved.

In an embodiment, the target parameter includes a first matrix, and the number of rows of the first matrix is greater than or equal to the number of columns. Column vectors of the first matrix are basis vectors. The basis vectors are selected from a predefined vector space or determined according to the downlink channel information.

In an embodiment, the configuration type of the SRS includes a first type and a second type. The first type includes: one SRS resource set corresponds to one downlink reference signal, one SRS resource set contains one SRS resource, and the number of ports contained in one SRS resource is equal to the number of columns of the target parameter. The second type includes: one SRS resource set corresponds to one downlink reference signal, each SRS resource in one SRS resource set corresponds to one port, and the number of SRS resources contained in one SRS resource set is equal to the number of columns of the target parameter.

In an embodiment, the beamforming module 310 is configured to: when the configuration type of the SRS is the first type, make a precoding of each port in one SRS resource correspond to a column vector of the target parameter; and, when the configuration type of the SRS is the second type, make a precoding of each SRS resource in one SRS resource set correspond to a column vector of the target parameter.

In an embodiment, the precoding information is used to indicate a second matrix. The number of rows of the second matrix is less than or equal to the number of columns of the first matrix, and the number of columns of the second matrix is equal to the number of layers of uplink transmission.

In an embodiment, when the configuration type of the SRS is the first type, the number of rows of the second matrix is equal to the number of target ports selected from the ports contained in an SRS resource, and the number of rows of the second matrix is equal to the number of target basis vectors selected from the column vectors of the first matrix. When the configuration type of the SRS is the second type, the number of rows of the second matrix is equal to the number of target SRS resources selected from an SRS resource set, and the number of rows of the second matrix is equal to the number of target basis vectors selected from the column vectors of the first matrix.

In an embodiment, the second matrix contains a weighting coefficient of each target basis vector in each layer, and the weighting coefficient is a complex number.

In an embodiment, the precoding information contains at least one of indication information of the number of layers of uplink transmission, selection information of target basis vectors, and quantification information of the second matrix.

In an embodiment, the bit width of the precoding information is determined according to at least one the number of columns of the first matrix; the number of target basis vectors; the maximum number of layers allowable for uplink transmission; a magnitude quantification precision for the weighting coefficient; and, a phase quantification precision for the weighting coefficient.

In an embodiment, the bit width of the indication information of the number of layers of uplink transmission contains 0 bit, or bits in a quantity that is the logarithm of the maximum number of layers allowable for uplink transmission.

In an embodiment, the bit width of the selection information of target basis vectors includes one of the following: bits in a quantity that is the logarithm of the first parameter, where the first parameter is the maximum number of possible combinations of target basis vectors selected from the column vectors of the first matrix; and, bits in a quantity that is the number of column vectors of the first matrix.

In an embodiment, the quantification information of the second matrix contains at least one of the position of the reference coefficient in the weighting coefficient in the second matrix, a quantified magnitude of the weighting coefficient, and a quantified phase of the weighting coefficient.

In an embodiment, the quantified magnitude of the weighting coefficient is determined according to the magnitude quantification precision. The quantified phase of the weighting coefficient is determined according to the phase quantification precision.

In an embodiment, the precoding matrix of the uplink transmission signal is a product of a third matrix and the second matrix. The third matrix consists of target basis vectors selected from the column vectors of the first matrix. The precoding of each layer of the uplink transmission signal corresponds to one column of the precoding matrix.

The apparatus for uplink transmission provided in the embodiment belongs to the same concept as the method for uplink transmission provided in the above embodiments, and the technical details that are not described in detail in the embodiment can refer to ant one of the above embodiments.

Figure 5:
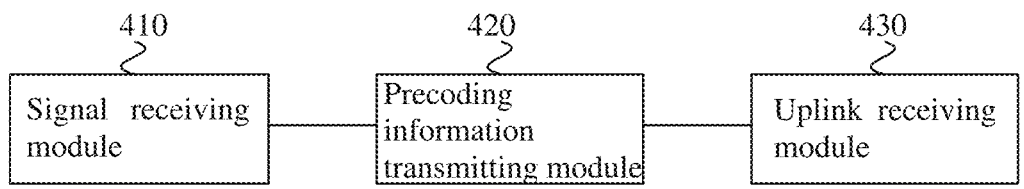
FIG. 5 is a schematic structural diagram of an apparatus for signal receiving according to an embodiment.

An embodiment of the present disclosure further provides an apparatus for signal receiving. FIG. 5 is a schematic structural diagram of an apparatus for signal receiving according to an embodiment. As shown in FIG. 5, the transmission apparatus includes: a signal receiving module 410, a precoding information transmitting module 420 and an uplink receiving module 430.

The signal receiving module 410 is configured to receive an SRS. The precoding information transmitting module 420 is configured to transmit precoding information according to the SRS. The uplink receiving module 430 is configured to receive an uplink transmission signal.

In the signal transmitting apparatus provided in the embodiment, a decision is made according to the beamformed SRS transmitted by a terminal device, and the precoding information is fed back to the terminal device to instruct the terminal device to upload an uplink transmission signal, thereby improving the precoding precision and the reliability of uplink transmission.

In an embodiment, the configuration type of the SRS includes a first type and a second type. The first type includes: one SRS resource set corresponds to one downlink reference signal, one SRS resource set contains one SRS resource, and the number of ports contained in one SRS resource is equal to the number of columns of the target parameter. The second type includes: one SRS resource set corresponds to one downlink reference signal, each SRS resource in one SRS resource set corresponds to one port, and the number of SRS resources contained in one SRS resource set is equal to the number of columns of the target parameter.

In an embodiment, the target parameter includes a first matrix, and the number of rows of the first matrix is greater than or equal to the number of columns. Column vectors of the first matrix are basis vectors. The basis vectors are selected from a predefined vector space or determined according to the downlink channel information.

In an embodiment, the precoding information is used to indicate a second matrix. The number of rows of the second matrix is less than or equal to the number of columns of the first matrix, and the number of columns of the second matrix is equal to the number of layers of uplink transmission.

In an embodiment, the apparatus further includes a port selection module and a resource selection module. The port selection module is configured to, when the configuration type of the SRS is the first type, select a target port from the ports contained in the SRS resource, the number of rows of the second matrix being equal to the number of target basis vectors selected from the column vectors of the first matrix. The resource selection module is configured to, when the configuration type of the SRS is the second type, select a target SRS resource from the SRS resource set, the number of rows of the second matrix being equal to the number of target basis vectors selected from the column vectors of the first matrix.

In an embodiment, the second matrix contains a weighting coefficient of each target basis vector in each layer, and the weighting coefficient is a complex number.

In an embodiment, the precoding information contains at least one of indication information of the number of layers of uplink transmission, selection information of target basis vectors, and quantification information of the second matrix.

The quantification information of the second matrix contains at least one of the position of the reference coefficient in the weighting coefficient in the second matrix, a quantified magnitude of the weighting coefficient, and a quantified phase of the weighting coefficient.

In an embodiment, the apparatus further includes at least one of a magnitude quantification module, a phase quantification module and a normalized module. The magnitude quantification module is configured to quantify the weighting coefficient according to the magnitude quantification precision of the weighting coefficient to obtain the quantified magnitude of the weighting coefficient. The phase quantification module is configured to quantify the weighting coefficient according to the phase quantification precision of the weighting coefficient to obtain the quantified phase of the weighting coefficient. The normalized module is configured to normalize the second matrix.

In an embodiment, the precoding matrix of the uplink transmission signal is a product of a third matrix and the second matrix, wherein the third matrix consists of target basis vectors selected from the column vectors of the first matrix, and the precoding of each layer of the uplink transmission signal corresponds to one column of the precoding matrix.

The apparatus for signal receiving provided in the embodiment belongs to the same concept as the method for signal receiving provided in the above embodiments, and the technical details that are not described in detail in the embodiment can refer to ant one of the above embodiments.

An embodiment of the present disclosure further provides a terminal device. The method for uplink transmission can be executed by a transmission apparatus, and the transmission apparatus can be implemented by software and/or hardware and integrated in the terminal device.

Figure 6:
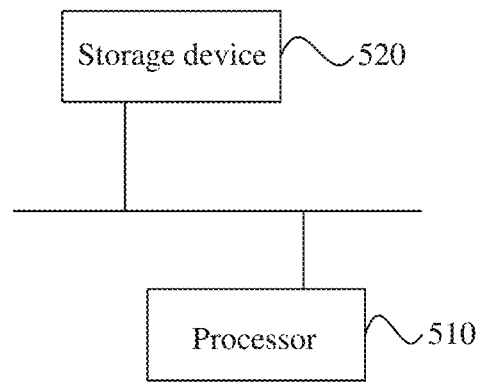
FIG. 6 is a schematic structural diagram of hardware of a terminal device according to an embodiment.

FIG. 6 is a schematic structural diagram of hardware of a terminal device according to an embodiment. As shown in FIG. 6, the terminal device provided in the embodiment includes a processor 510 and a storage device 520. The terminal device may have one or more processors 70. FIG. 6 is illustrated by taking one processor 510 as an example. The processor 510 and the storage device 520 in the device can be connected via a bus or in other ways. FIG. 6 is illustrated by taking the processor and the storage device being connected via a bus as an example.

The one or more programs, when executed by the one or more processors 510, cause the one or more processors to carry out the method for uplink transmission according to any one of the above embodiments.

As a non-transitory computer-readable storage medium, the storage device 520 in the terminal device may be configured to store one or more programs. The programs may be software programs, computer-executable programs and modules, for example program instructions/modules corresponding to the transmission method in the embodiments of the present invention (for example, the modules in the apparatus for uplink transmission shown in FIG. 4, including: the beamforming module 310, the precoding information receiving module 320 and the uplink transmission module 330). The software programs, instructions and modules stored in the storage device 520, when executed by the processor 510, cause the processor to perform various functional applications and data processing of the terminal device, so as to carry out the method for uplink transmission in the above method embodiments.

The storage device 520 mainly includes a program storage region and a data storage region. The program storage region may store application programs required by the operating system and at least one function. The data storage region may store data generated according to the use of the device and the like (e.g., the target parameter, precoding information and the like in the above embodiments). In addition, the storage device 520 may include high-speed random-access memories, or may include non-volatile memories, for example, at least one magnetic disk memory device, flash memory devices or other non-volatile solid-state memory devices. In some instances, the storage device 520 may include memories remotely arranged relative to the processor 510. These remote memories may be connected to the terminal device via a network. Examples of the network include, but not limited to, Internet, Intranet, local area networks, mobile communication networks and combinations thereof.

In addition, the one or more programs included in the terminal device, when executed by the one or more processors 510, cause the one or more processors to implement the following operations: performing beamforming on an SRS according to a target parameter, the target parameter being determined according to downlink channel information; receiving precoding information; and, transmitting an uplink transmission signal according to the target parameter and the precoding information.

The terminal device provided in the embodiment belongs to the same concept as the method for uplink transmission provided in the above embodiments, and the technical details that are not described in detail in the embodiment can refer to ant one of the above embodiments.

An embodiment of the present disclosure further provides a service node. The method for signal receiving may be executed by a transmission apparatus, and the transmission apparatus may be implemented by software and/or hardware and integrated in the service node.

Figure 7:
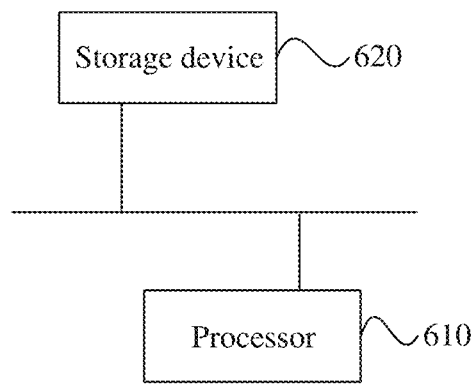
FIG. 7 is a schematic structural diagram of hardware of a service node according to an embodiment.

FIG. 7 is a schematic structural diagram of hardware of a service node according to an embodiment. As shown in FIG. 7, the service node provided in the embodiment includes a processor 610 and a storage device 620. The service node may have one or more processors. FIG. 7 is illustrated by taking one processor 610 as an example. The processor 610 and the storage device 620 in the device may be connected via a bus or in other ways. FIG. 7 is illustrated by taking the processor and the storage device being connected via a bus as an example.

The one or more programs, when executed by the one or more processors 610, cause the one or more processors to carry out the method for signal receiving according to any one of the above embodiments.

As a non-transitory computer-readable storage medium, the storage device 620 in the service node may be configured to store one or more programs. The programs may be software programs, computer-executable programs and modules, for example program instructions/modules corresponding to the transmission method in the embodiments of the present invention (for example, the modules in the apparatus for signal receiving shown in FIG. 5, including: the signal receiving module 410, the precoding information transmitting module 420 and the uplink receiving module 430). The software programs, instructions and modules stored in the storage device 620, when executed by the processor 610, cause the processor to perform various functional applications and data processing of the service node, so as to carry out the method for signal receiving in the above method embodiments.

The storage device 620 mainly includes a program storage region and a data storage region. The program storage region may store application programs required by the operating system and at least one function. The data storage region may store data generated according to the use of the device and the like (e.g., the target parameter, precoding information and the like in the above embodiments). In addition, the storage device 620 may include high-speed random-access memories, or may include non-volatile memories, for example, at least one magnetic disk memory device, flash memory devices or other non-volatile solid-state memory devices. In some instances, the storage device 620 may include memories remotely arranged relative to the processor 610. These remote memories may be connected to the service node via a network. Examples of the network include, but not limited to, Internet, Intranet, local area networks, mobile communication networks and combinations thereof.

In addition, the one or more programs included in the service node, when executed by the one or more processors 610, cause the one or more processors to perform the following operations: receiving an SRS; transmitting precoding information according to the SRS; and, receiving an uplink transmission signal.

The service node provided in the embodiment belongs to the same concept as the method for signal receiving provided in the above embodiments, and the technical details that are not described in detail in the embodiment can refer to ant one of the above embodiments.

An embodiment of the present disclosure further provides a storage medium containing computer-executable instructions which, when executed by a computer processor, cause the computer processor to carry out a method for uplink transmission or a method for signal receiving.

From the foregoing embodiment of the implementations, it should be understood by those having ordinary skills in the art that the present disclosure may be implemented by means of software and general-purpose hardware or may be implemented by means of hardware. Based on this understanding, the technical schemes of the present disclosure may be embodied in the form of a software product. The computer software product may be stored in a computer-readable storage medium, for example, floppy disks, read-only memories (ROMs), random access memories (RAMs), flash memories (FLASH), hard disks, optical disks or the like of computers, and includes a plurality of instructions configured to cause a computer device (which may be a personal computer, a server, a network device, etc.) to execute the methods according to any one of the above embodiments of the present disclosure.

The foregoing description merely shows the exemplary embodiments of the present disclosure, and is not intended to limit the protection scope of the present disclosure.

The blocks of any logic flow in the accompanying drawings of the present disclosure may represent program steps, or may represent interconnected logic circuits, modules and functions, or may represent combinations of program steps and logic circuits, modules or functions. The computer programs may be stored on a memory. The memory may be of any type suitable for the local technical environment and may be implemented by any suitable data storage technology, for example, but not limited to, read only memories (ROMs), random access memories (RAMs), optical memory devices and systems (digital versatile discs (DVDs) or compact disks (CDs)), etc. The computer-readable medium may include non-transient storage mediums. The data processor may be of any type suitable for the local technical environment, for example, but not limited to, general purpose computers, special purpose computers, microprocessors, digital signal processors (DSPs), application specific integrated circuits (ASICs), field programmable gate arrays (FGPAs), and processors based on a multicore processor architecture.

The invention claimed is:

1. A method for uplink transmission, comprising:
performing beamforming on a Sounding Reference Signal (SRS) according to a target parameter, and transmitting the SRS beamformed, wherein the target parameter is determined according to downlink channel information;
receiving precoding information; and
transmitting an uplink transmission signal according to the target parameter and the precoding information.

2. The method of claim 1, wherein the target parameter comprises a first matrix, and the number of rows of the first matrix is greater than or equal to the number of columns;
column vectors of the first matrix are basis vector; and
the basis vectors are selected from a predefined vector space or determined according to the downlink channel information.

3. The method of claim 2, wherein configuration types of the SRS comprise a first type and a second type;
the first type comprises: one SRS resource set corresponding to one downlink reference signal, one SRS resource set containing one SRS resource, and the number of ports contained in one SRS resource being equal to the number of columns of the first matrix; and
the second type comprises: one SRS resource set corresponding to one downlink reference signal, each SRS resource in one SRS resource set corresponding to one port, and the number of SRS resources contained in one SRS resource set being equal to the number of columns of the first matrix.

4. The method of claim 3, wherein the performing beamforming on an SRS according to a target parameter comprises:
in response to the configuration type of the SRS being the first type, a precoding of each port in one SRS resource corresponding to a column vector of the first matrix; and
in response to the configuration type of the SRS being the second type, a precoding of each SRS resource in one SRS resource set corresponding to a column vector of the first matrix.

5. The method of claim 3, wherein the precoding information is used to indicate a second matrix, and the number of rows of the second matrix is less than or equal to the number of columns of the first matrix; and
the number of columns of the second matrix is equal to the number of layers of uplink transmission.

6. The method of claim 5, wherein,
in response to the configuration type of the SRS being the first type, the number of rows of the second matrix is equal to the number of target basis vectors selected from column vectors of the first matrix; and
in response to the configuration type of the SRS being the second type, the number of rows of the second matrix is equal to the number of target basis vectors selected from the column vectors of the first matrix.

7. The method of claim 6, wherein the second matrix contains a weighting coefficient of each target basis vector in each layer, and the weighting coefficient is a complex number.

8. The method of claim 7, wherein the precoding information contains at least one of:
indication information of the number of layers of uplink transmission, selection information of target basis vectors, and quantification information of the second matrix.

9. The method of claim 8, wherein a bit width of the precoding information is determined according to at least one of:
the number of columns of the first matrix;
the number of target basis vectors;
the maximum number of layers allowable for uplink transmission;

a magnitude quantification precision for the weighting coefficient; and
a phase quantification precision for the weighting coefficient.

10. The method of claim 9, wherein a bit width of the indication information of the number of layers of uplink transmission contains 0 bit, or bits in a quantity that is the logarithm of the maximum number of layers allowable for uplink transmission.

11. The method of claim 9, wherein a bit width of the selection information of target basis vectors comprises at least one of:
bits in a quantity that is the logarithm of the first parameter, wherein the first parameter is the maximum number of possible combinations of target basis vectors selected from the column vectors of the first matrix; and
bits in a quantity that is the number of column vectors of the first matrix.

12. The method of claim 8, wherein the quantification information contains at least one of:
a position of a reference coefficient in the weighting coefficient in the second matrix, a quantified magnitude of the weighting coefficient, and a quantified phase of the weighting coefficient.

13. The method of claim 12, wherein,
the quantified magnitude of the weighting coefficient is determined according to the magnitude quantification precision; and
the quantified phase of the weighting coefficient is determined according to the phase quantification precision.

14. The method of claim 5, wherein a precoding matrix of the uplink transmission signal is a product of a third matrix and the second matrix, wherein the third matrix consists of target basis vectors selected from the column vectors of the first matrix; and
a precoding of each layer of the uplink transmission signal corresponds to one column of the precoding matrix.

15. A terminal device, comprising:
at least one processor; and
a storage device configured to store at least one program;
wherein the at least one program, when executed by the at least one processor, causes the at least one processor to carry out the method for uplink transmission of claim 1.

16. A non-transitory computer-readable storage medium having computer programs stored thereon which, when executed by a processor, cause the processor to carry out the method for uplink transmission of claim 1.

17. A method for signal receiving, comprising:
receiving a sounding reference signal (SRS), wherein the SRS is beamformed by a terminal device according to a target parameter, and the target parameter is determined according to downlink channel information;
transmitting precoding information according to the SRS; and
receiving an uplink transmission signal, wherein the uplink transmission signal is transmitted by the terminal device according to the target parameter and the precoding information.

18. The method of claim 17, wherein configuration types of the SRS comprise a first type and a second type;
the first type comprises: one SRS resource set corresponding to one downlink reference signal, one SRS resource set containing one SRS resource, and the number of ports contained in one SRS resource being equal to the number of columns of a target parameter; and
the second type comprises: one SRS resource set corresponding to one downlink reference signal, each SRS resource in one SRS resource set corresponding to one port, and the number of SRS resources contained in one SRS resource set being equal to the number of columns of the target parameter.

19. A service node, comprising:
at least one processer; and
a storage device configured to store at least one program;
wherein the at least one program, when executed by the at least one processor, causes the at least one processor to carry out the method for signal receiving of claim 17.

20. A non-transitory computer-readable storage medium having computer programs stored thereon which, when executed by a processor, cause the processor to carry out the method for uplink transmission of claim 17.

* * * * *